(12) United States Patent
Saito et al.

(10) Patent No.: US 11,214,224 B2
(45) Date of Patent: Jan. 4, 2022

(54) PASSENGER RESTRAINT APPARATUS

(71) Applicant: Autoliv Development AB, Vargarda (SE)

(72) Inventors: Hiroyuki Saito, Kanagawa (JP); Tetsuya Matsushita, Kanagawa (JP)

(73) Assignee: Autoliv Development AB, Vargarda (SE)

( * ) Notice: Subject to any disclaimer, the term of this patent is extended or adjusted under 35 U.S.C. 154(b) by 0 days.

(21) Appl. No.: 16/765,933

(22) PCT Filed: Oct. 31, 2018

(86) PCT No.: PCT/JP2018/040523
§ 371 (c)(1),
(2) Date: May 21, 2020

(87) PCT Pub. No.: WO2019/107053
PCT Pub. Date: Jun. 6, 2019

(65) Prior Publication Data
US 2020/0331421 A1    Oct. 22, 2020

(30) Foreign Application Priority Data

Nov. 30, 2017 (JP) .............................. JP2017-229933
Jul. 19, 2018 (JP) .............................. JP2018-135996

(51) Int. Cl.
*B60R 21/231* (2011.01)
*B60N 2/427* (2006.01)
(Continued)

(52) U.S. Cl.
CPC .... *B60R 21/23138* (2013.01); *B60N 2/42745* (2013.01); *B60R 21/207* (2013.01);
(Continued)

(58) Field of Classification Search
CPC ............ B60R 21/23138; B60R 21/207; B60R 21/2338; B60R 2021/23107;
(Continued)

(56) References Cited

U.S. PATENT DOCUMENTS 5,636,862 A * 6/1997 Cheung ................. B60R 21/207
280/730.2
8,690,187 B2 * 4/2014 Fukawatase .......... B60R 21/207
280/730.2
(Continued)

FOREIGN PATENT DOCUMENTS

JP    2009-29182 A    2/2009
JP    2014-12495 A    1/2014
(Continued)

OTHER PUBLICATIONS

International Search Report of the International Searching Authority for PCT/JP2018/040523 dated Jan. 15, 2019.
(Continued)

*Primary Examiner* — Drew J Brown
(74) *Attorney, Agent, or Firm* — Harness, Dickey & Pierce, P.L.C.; Stephen T. Olson

(57) ABSTRACT

[Problem] To provide a passenger restraint apparatus capable of suppressing the movement of an airbag away from a passenger without requiring a complex structure.
[Resolution Means] A passenger restraint apparatus according to the present invention is configured to include a seat of a vehicle and restrain a passenger seated in this seat, wherein this passenger restraint apparatus includes: an airbag which is stored in a seat back part of the seat, and expanded and deployed to the side of the passenger seated in this seat; and a tension fabric which passes through the side opposite the passenger of the stored airbag so as to be stored from the seat back part of the seat to the seat cushion part, wherein, when the airbag is expanded and deployed, at least a portion of the
(Continued)

tension fabric is configured so as to be deployed to the outside of this seat by the cleaving of the skin of the seat, in addition to being stretched from the position in the vicinity of the shoulder of the passenger in the seat back to the position on the front side of the vehicle on the side of the seat cushion, and wherein this tension fabric includes a part for holding the surface of the airbag opposite the passenger.

13 Claims, 13 Drawing Sheets

(51) Int. Cl.
  *B60R 21/207* (2006.01)
  *B60R 21/2338* (2011.01)
(52) U.S. Cl.
  CPC  *B60R 21/2338* (2013.01); *B60R 2021/23107* (2013.01); *B60R 2021/23146* (2013.01); *B60R 2021/23388* (2013.01)
(58) Field of Classification Search
  CPC ........... B60R 2021/23146; B60R 2021/23388; B60R 2021/23386; B60R 21/233; B60N 2/42745; B60N 2/42
  See application file for complete search history.

(56) References Cited

U.S. PATENT DOCUMENTS

| | | | | |
|---|---|---|---|---|
| 9,238,425 | B2* | 1/2016 | Fukawatase | B60R 21/013 |
| 10,189,432 | B2* | 1/2019 | Matsushita | B60R 22/00 |
| 2015/0314748 | A1* | 11/2015 | Mihm | B60R 21/2338 |
| | | | | 280/730.2 |
| 2015/0367803 | A1* | 12/2015 | Fujiwara | B60R 21/207 |
| | | | | 280/728.2 |
| 2017/0259774 | A1 | 9/2017 | Matsushita et al. | |

FOREIGN PATENT DOCUMENTS

| | | |
|---|---|---|
| WO | 2013/108473 A1 | 7/2013 |
| WO | 2016/039160 A1 | 3/2016 |

OTHER PUBLICATIONS

English translation of International Search Report of the International Searching Authority for PCT/JP2018/040523 dated Jan. 15, 2019.

* cited by examiner (a)

(b)

(a)

(b)

(a)

(b)　　　　　　　　(c)

(a)

(b) (c)

(a)

(b)

(a)        (b)        (c)

PASSENGER RESTRAINT APPARATUS

TECHNICAL FIELD

The present invention relates to a passenger restraint apparatus for restraining a passenger seated in a seat of a vehicle.

BACKGROUND

In recent years, airbag apparatuses have generally become standard equipment in vehicles. An airbag apparatus is a safety apparatus which is operated in the event of an emergency such as a vehicle collision and expanded and deployed at a gas pressure to receive a passenger. There are various types of airbag apparatuses depending on the installation site and application. For example, in the passenger protection apparatus of Patent Document 1, a side airbag which is expanded and deployed immediately next to a passenger is provided on both sides of a seat. According to Patent Document 1, movement to the non-collision side (other side in the vehicle width direction) due to swing back, etc. of the movement to the collision side (one side in the vehicle width direction) upon a collision can be regulated.

CITATION LIST

Patent Literature

Patent Document 1: JP 2014-034356 A

SUMMARY OF INVENTION

Technical Problem

In an airbag apparatus for receiving a passenger on the side as in Patent Document 1, when an airbag moves away from the passenger in the vehicle width direction, the performance for restraining the passenger deteriorates. Consequently, in Patent Document 1, a tension cloth apparatus is provided on the inner side of an inner airbag in the vehicle width direction. The tension cloth apparatus of Patent Document 1 has a tension cloth as a member which is deployed to the side, along with a pop-up bar structure as a deploying means.

With the configuration of Patent Document 1, when supported by the tension cloth provided on the inner side in the vehicle width direction, the movement of the inner airbag in the vehicle width direction is suppressed. Consequently, the inward movement of the passenger in the vehicle width direction is presumably regulated. Unfortunately, in Patent Document 1, the pop-up bar structure is required as a means for deploying the tension cloth. Hence, although the abovementioned effects can be obtained, the structure becomes complicated, thereby causing an increase in the weight of a vehicle as well as the costs of the apparatus.

The present invention has been created in view of the abovementioned problems, with the object of providing a passenger restraint apparatus capable of suppressing the movement of an airbag away from a passenger without requiring complex structures.

Solution to Problem

In order to solve the above problems, in a typical configuration, a passenger according to the present invention includes a seat of a vehicle and restrains a passenger seated in this seat, wherein this passenger restraint apparatus includes an airbag which is stored in a seat back part of the seat, and expanded and deployed to the side of the passenger seated in this seat; and a tension fabric which passes through the side opposite the passenger of the stored airbag so as to be stored from the seat back part of the seat to the seat cushion part, wherein, when the airbag is expanded and deployed, at least a portion of the tension fabric is configured so as to be deployed to the outside of this seat by the cleaving of the skin of the seat, in addition to being stretched from the position in the vicinity of the shoulder of the passenger in the seat back to the position on the front side of the vehicle on the side of the seat cushion, and wherein this tension fabric includes a part for holding the surface of the airbag opposite the passenger.

In the abovementioned configuration, when the airbag is expanded and deployed upon a collision of the vehicle, etc., the tension fabric is deployed to the outside of the seat. At this time, the tension fabric is stretched from the position in the vicinity of the shoulder of the passenger in the seat back to the position on the front side of the vehicle on the side of the seat cushion so as to hold the surface of the airbag opposite the passenger. The movement of the expanded and deployed airbag away from the passenger in the vehicle width direction is regulated using the tension fabric. Consequently, the passenger restraint performance of the airbag can be increased. Moreover, in the abovementioned configuration, the tension fabric is stored from the inside of the seat back to the seat cushion part of the seat and deployed therebetween when the airbag is expanded and deployed. Consequently, without requiring a deploying means having a complex structure, the abovementioned effects can be obtained.

In order to solve the above problems, in another configuration, a passenger restraint apparatus according to the present invention includes a seat of a vehicle and restrains a passenger seated in this seat, wherein this passenger restraint apparatus includes: an airbag which is stored in a seat back part of the seat, and expanded and deployed to the side of the passenger seated in this seat; a tension fabric which passes through the side opposite the passenger the stored airbag; and a case which is disposed on the side of the seat so as to house at least a portion of the tension fabric, wherein, when the airbag is expanded and deployed, the tension fabric is configured so as to be deployed from the case to the outside of this seat, in addition to being stretched from the position in the vicinity of the shoulder of the passenger in the seat back to the position on the front side of the vehicle on the side of the seat cushion, and wherein this tension fabric includes a part for holding the surface of the airbag opposite the passenger. With such a configuration, the same effects as described above can be obtained.

In order to solve the above problems, in another configuration, a passenger restraint apparatus according to the present invention includes a pair of airbags which are stored in a seat back part of the seat so as to be expanded and deployed to both sides of the passenger seated in this seat; and a pair of tension fabrics which pass through each side opposite the passenger of the pair of stored airbags so as to be stored from the seat back part of the seat to the seat cushion part, wherein, when the airbag is expanded and deployed, at least a portion of each of the pair of tension fabrics is configured so as to be deployed to the outside of this seat by the cleaving of the skin of the seat, in addition to being stretched from the position in the vicinity of the shoulder of the passenger in the seat back to the position on the front side of the vehicle on the side of the seat cushion, wherein this tension fabric includes a part for holding the surface of the airbag opposite the passenger, and wherein the space between the positions in the vicinity of the shoulder is narrower than the shoulder width of an AM50 dummy, with the positions serving as the starting points across which the tension fabrics are stretched.

According to such a configuration, also in the passenger restraint apparatus which includes the pair of airbags expanded and deployed to both sides of the passenger seated in the seat, the abovementioned effects can be obtained. Moreover, the pair of tension fabrics respectively provided in the pair of airbags are stretched with the positions in the vicinity of the shoulder of the passenger serving as the starting points, with the space between these positions set to be narrower than the shoulder width of an AM50 dummy. As a result, the airbags can further effectively approach the shoulder of the passenger. Consequently, the airbags can more assuredly restrain the passenger and improve the abovementioned passenger restraint performance.

In order to solve the above problems, in another configuration, a passenger restraint apparatus according to the present invention includes a seat of a vehicle and restrains a passenger seated in this seat, wherein this passenger restraint apparatus includes: a pair of airbags which are stored in a seat back part of the seat so as to be expanded and deployed to both sides of the passenger seated in this seat; and a pair of tension fabrics which pass through each side opposite the passenger of the pair of stored airbags so as to be stored from the seat back part of the seat to the seat cushion part; and a case which is disposed on the side of the seat so as to house at least a portion of each of the tension fabrics, wherein, when the airbag is expanded and deployed, at least a portion of each of the pair of tension fabrics is configured so as to be deployed from the case to the outside of this seat, in addition to being stretched from the position in the vicinity of the shoulder of the passenger in the seat back to the position on the front side of the vehicle on the side of the seat cushion, wherein this tension fabric includes a part for holding the surface of the airbag opposite the passenger, and wherein the space between the positions in the vicinity of the shoulder is narrower than the shoulder width of an AM50 dummy, with the positions serving as the starting points across which the tension fabrics are stretched. With such a configuration, the same effects as described above can be obtained.

The space between the positions in the vicinity of the shoulder may be narrower after the tension fabrics are deployed than before the tension fabrics are deployed, with the positions serving as the starting points across which the tension fabrics are stretched. As a result, the pair of airbags can further approach the passenger side using the pair of tension fabrics. Consequently, the shoulder of the passenger can be more efficiently restrained, while the abovementioned effects can be increased.

A skeleton may be formed in the seat by a seat frame disposed thereinside, wherein one end of the tension fabric may be fixed to the seat frame at the position in the vicinity of the shoulder of the passenger in the seat back of the seat so as to be stretched with the position serving as the starting point. As a result, the seat frame can be used as a means for fixing the tension fabric so as to stably fix the tension fabric.

One end of the tension fabric may be wound around the seat frame, wherein this passenger restraint apparatus may further include a bracket which grasps one end of the tension fabric wound around the seat frame so as to fix this one end to this seat frame. As a result, the tension fabric can be more firmly fixed to the seat frame.

The bracket may cover the entire part of one end of the tension fabric wound around the seat frame. As a result, because the fixing position (winding position) of the tension fabric to the seat frame is collectively covered with the bracket, the above mentioned effects can be increased.

This passenger restraint apparatus may further include a rotation interlocking mechanism which interlocks with the rotation of the seat back to the seat cushion, wherein one end of the tension fabric may be coupled to the rotation interlocking mechanism at the position in the vicinity of the shoulder of the passenger so as to be stretched with this position serving as the starting point, and wherein, when the seat back rotates to the front of the vehicle with respect to the seat cushion upon a collision of the vehicle, the tension fabric may be pulled by the rotation interlocking mechanism to receive tension. As a result, when the seat back rotates to the front of the vehicle with respect to the seat cushion upon a collision of the vehicle, etc., loosening of the tension fabric can be prevented. Consequently, the effects in which the airbag is held by the tension fabric can be suitably ensured.

The rotation interlocking mechanism may include: a support for supporting the tension fabric at the position in the vicinity of the shoulder of the passenger; and a first gear to which the tension fabric incoming from the support is indirectly connected, and wherein, when the seat back rotates to the front of the vehicle with respect to the seat cushion upon a collision of the vehicle, the first gear may rotate in the direction of winding the tension fabric by interlocking with this rotation so as to impart tension to this tension fabric. According to such a configuration, because the first gear rotates by interlocking with the rotation of the seat back, the abovementioned effects can be obtained.

The rotation interlocking mechanism may further include a pulley for supporting the tension fabric incoming from the support, wherein the first gear may be fixed to the side of the pulley, and wherein the tension fabric may be connected to this first gear via this pulley. As in such a configuration, the pulley can support the tension fabric so as to smoothly wind the tension fabric. Consequently, the abovementioned effects can be increased.

The rotation interlocking mechanism may further include: a pulley for supporting the tension fabric incoming from the support; and a second gear which is fixed to the side of the pulley so as to engage with the first gear, wherein the tension fabric may be connected to the first gear via the pulley and the second gear. In such a configuration including multiple gears, the gears can be more smoothly rotated so as to increase the abovementioned effects.

The rotation interlocking mechanism may further include: a pulley for supporting the tension fabric incoming from the support; a second gear which is fixed to the side of the first gear so as to rotate by interlocking with this first gear; and a third gear which is fixed to the side of the pulley so as to engage with the second gear, wherein the tension fabric may be connected to the first gear via the pulley, the second gear, and the third gear. Such a configuration also includes multiple gears to enable the smooth rotation of the gears. Consequently, the abovementioned effects can be increased.

This passenger restraint apparatus may include a load relief mechanism for relieving a load applied from the tension fabric to the seat upon deployment of this tension fabric. As mentioned above, the tension fabric is stretched between the seat back and the seat cushion so as to hold the surface of the expanded and deployed airbag opposite the passenger. At this time, as the airbag is expanded and deployed, the tension of the tension fabric increases. As a result, a large load is applied from the tension fabric to the seat (to which the tension fabric is connected), specifically, to the connecting part of the tension fabric in the seat back. This may damage the seat back.

With that, in the present invention, the load relief mechanism is provided in the passenger restraint apparatus. As a result, when a large load is applied from the tension fabric to the seat upon deployment, the load relief mechanism functions to relieve the load applied to the seat. Consequently, any damage to the seat caused by the load from the tension fabric can be suitably prevented.

A skeleton may be formed in the seat by a seat frame disposed thereinside, wherein the load relief mechanism may include: a first shaft which is fixed to the seat frame at the position in the vicinity of the shoulder of the passenger in the seat back of the seat; a guide hole formed in an arc shape in the seat frame around the first shaft; a second shaft which is movable in the guide hole and to which one end of the tension fabric is fixed; and a coupling part which couples the first shaft and the second shaft so as to make this second shaft rotatable with this first shaft serving as a fulcrum, and wherein, when the tension fabric is deployed to the outside of the seat and the load applied from the tension fabric to the seat via the second shaft is a predetermined value or more, the second shaft may rotate so as to loosen the tension fabric and relieve this load. According to such a configuration, the abovementioned effects can be favorably obtained.

Advantageous Effects of Invention

The present invention has the object of providing a passenger restraint apparatus capable of suppressing the movement of an airbag away from a passenger without requiring complex structures.

REFERENCE SIGNS LIST

100 . . . Passenger restraint apparatus, 110 . . . Seat, 112 . . . Seat back part, 114 . . . Seat cushion part, 116 . . . Headrest, 118 . . . Cover, 120a . . . Airbag, 120b . . . Airbag, 130a . . . Tension fabric, 130b . . . Tension fabric, 132a . . . End, 132b . . . End, 140 . . . Seat frame, 142 . . . Upper frame, 144 . . . Lower frame, 150 . . . Bracket, 200 . . . Passenger restraint apparatus, 210 . . . Rotation interlocking mechanism, 212 . . . Support, 214 . . . First gear, 216 . . . Pulley, 220 . . . Vehicle body member, 222 . . . Fixed gear, 300 . . . Passenger restraint apparatus, 310 . . . Rotation interlocking mechanism, 314 . . . Second gear, 400 . . . Passenger restraint apparatus, 410 . . . Rotation interlocking mechanism, 414 . . . Third gear, 500 . . . Passenger restraint apparatus, 510 . . . Rotation interlocking mechanism, 512 . . . Support, 514 . . . Coupling wire, 516 . . . Slider, 518 . . . Rail, 520 . . . Tether, P . . . Passenger 600 . . . Passenger restraint apparatus, 610 . . . Load relief mechanism, 612 . . . First shaft, 614 . . . Second shaft, 616 . . . Coupling part, 618 . . . Guide hole

DESCRIPTION OF EMBODIMENTS

Preferred embodiments according to the present invention will hereinafter be described in detail with reference to the appended drawings. The dimensions, materials, other specific numerical values, etc. indicated in such embodiments are mere exemplifications for ease of understanding of the invention and do not limit the present invention unless otherwise noted. Note that in the present specification and drawings, elements having substantially identical functions and configurations are labeled with identical symbols to omit redundant descriptions along with the illustration of elements not directly related to the present invention. In the figure used in the following description, the front-rear and left-right directions of a vehicle are denoted as Fr, Rr, L, and R.

Embodiment 1

Figure 1:
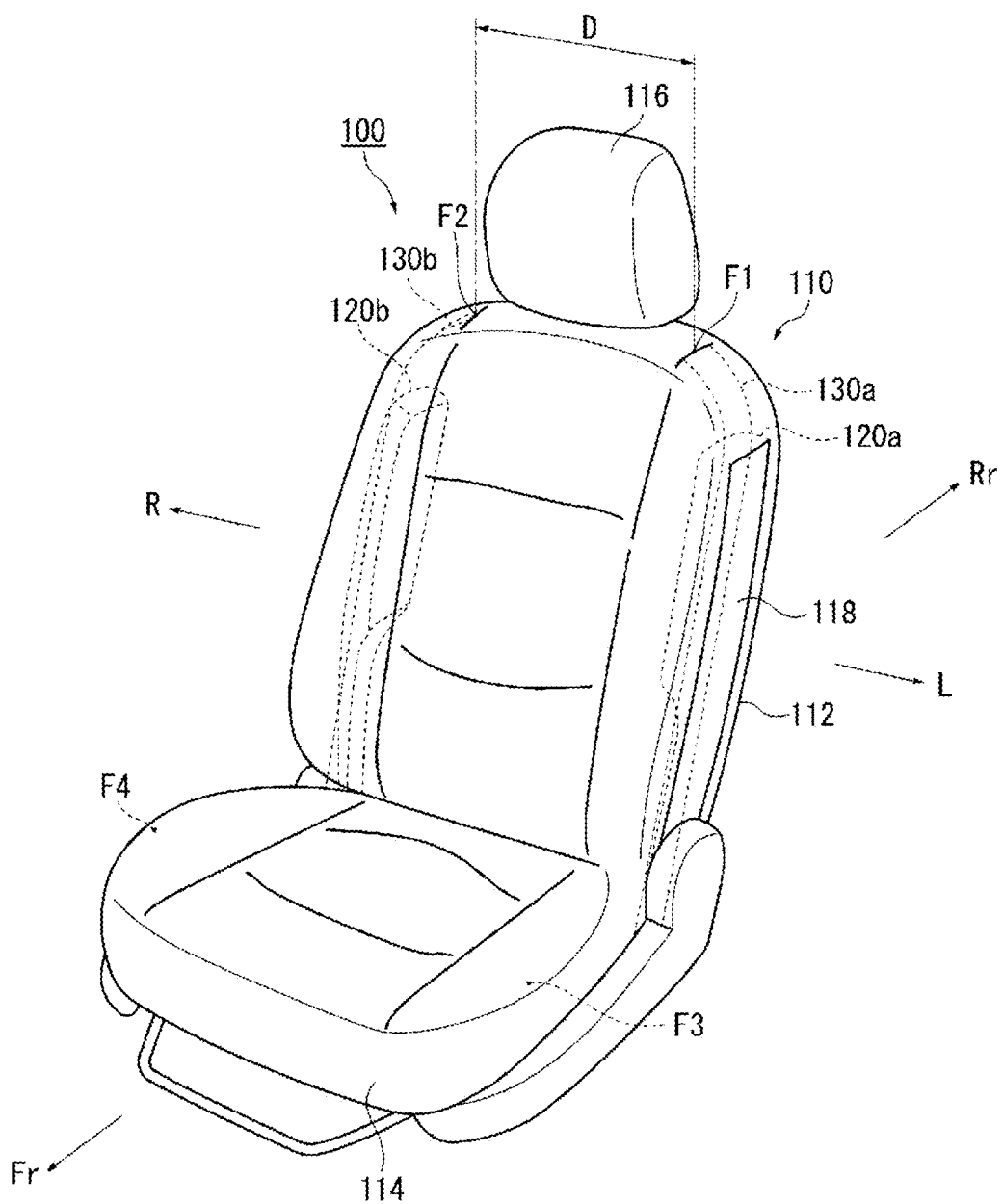
FIG. 1 is a view illustrating a passenger restraint apparatus according to Embodiment 1.

FIG. 1 is a view illustrating a passenger restraint apparatus 100 according to Embodiment 1. To facilitate understanding, FIG. 1 illustrates members (below-mentioned airbags 120a, 120b and tension fabrics 130a, 130b) stored inside a seat 110 by virtual lines. Moreover, FIG. 1 illustrates the airbags 120a, 120b and the tension fabrics 130a, 130b upon non-expansion and deployment.

The passenger restraint apparatus 100 according to Embodiment 1 is an apparatus for restraining a passenger seated in the seat 110. As illustrated in FIG. 1, the passenger restraint apparatus 100 according to Embodiment 1 includes the seat 110, airbags 120a, 120b, and tension fabrics 130a, 130b of a vehicle (not illustrated in its entirety). The seat 110 includes a seat back 112 for supporting the upper part of the body of the passenger. A seat cushion 114 for the passenger to be seated in is provided below the seat back 112. A headrest 116 for supporting the head of the passenger is provided above the seat back.

As illustrated in FIG. 1, the airbags 120a, 120b (side airbags) are respectively stored inside the seat back 112 of the seat 110 on left and right sides and covered with a cover 118. Upon a collision of the vehicle, etc., a pair of airbags 120a, 120b on both the left and right sides are expanded and deployed on both sides of the passenger seated in the seat 110.

The tension fabrics 130a, 130b are respectively provided at the pair of airbags 120a, 120b in the present embodiment. That is, the passenger restraint apparatus 100 according to the present embodiment includes the pair of tension fabrics 130a, 130b. The tension fabrics 130a, 130b pass through each side opposite the passenger of the pair of stored airbags 120a, 120b so as to be stored from a seat back part 112 to a seat cushion part 114 of the seat 110.

Figure 2:
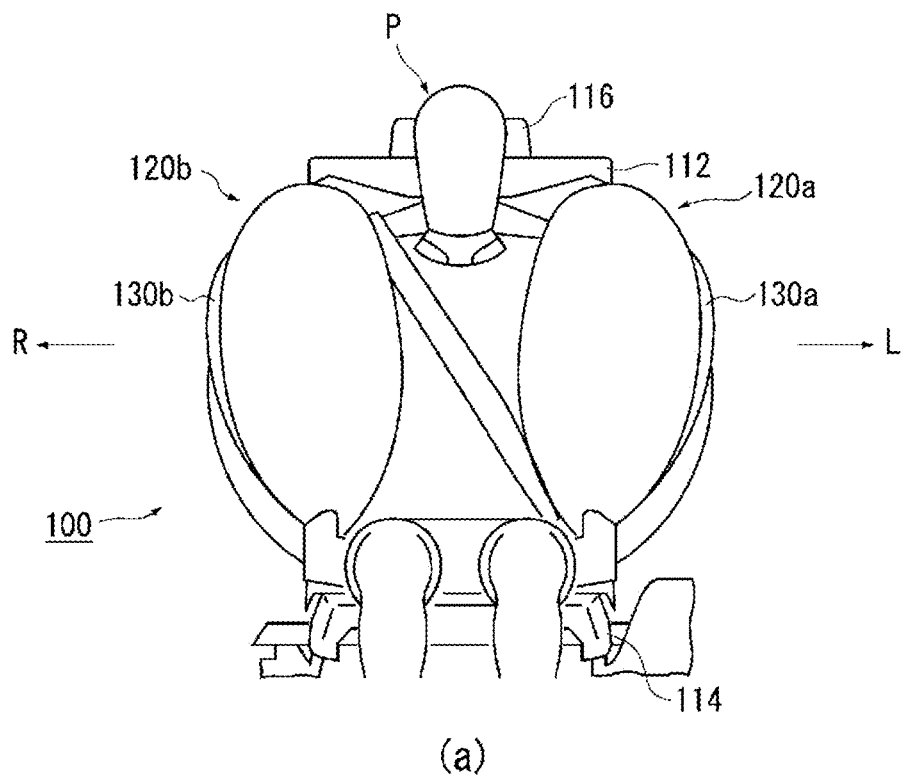
FIG. 2 is a view illustrating the state in which the passenger P is seated in the seat in FIG. 1.
Figure 2:
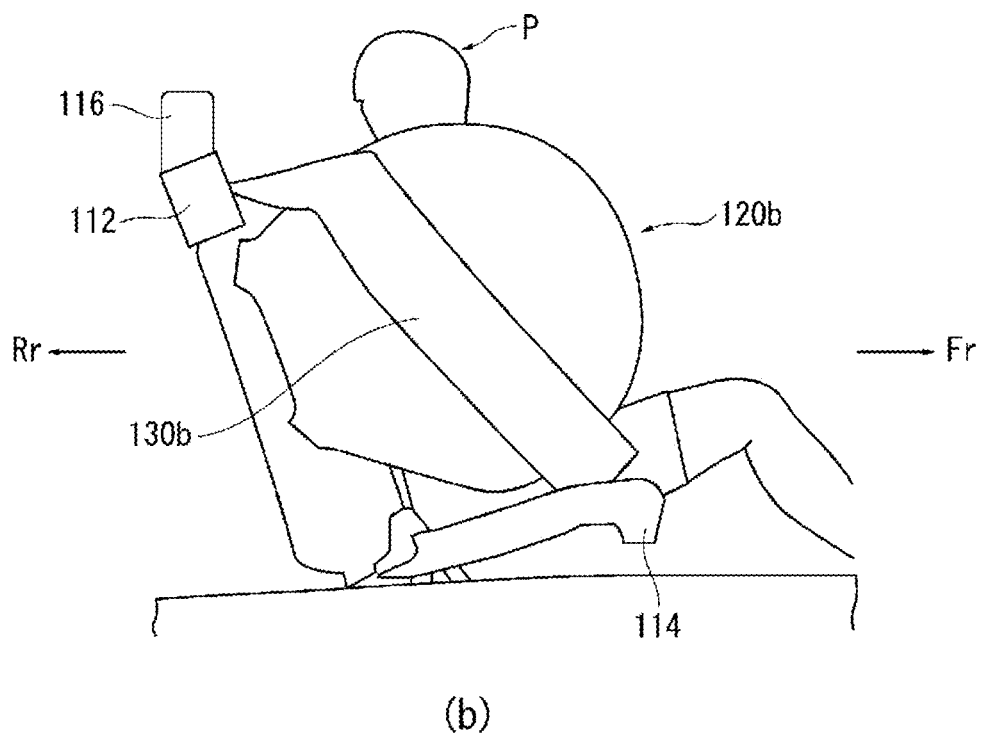
Figure 3:
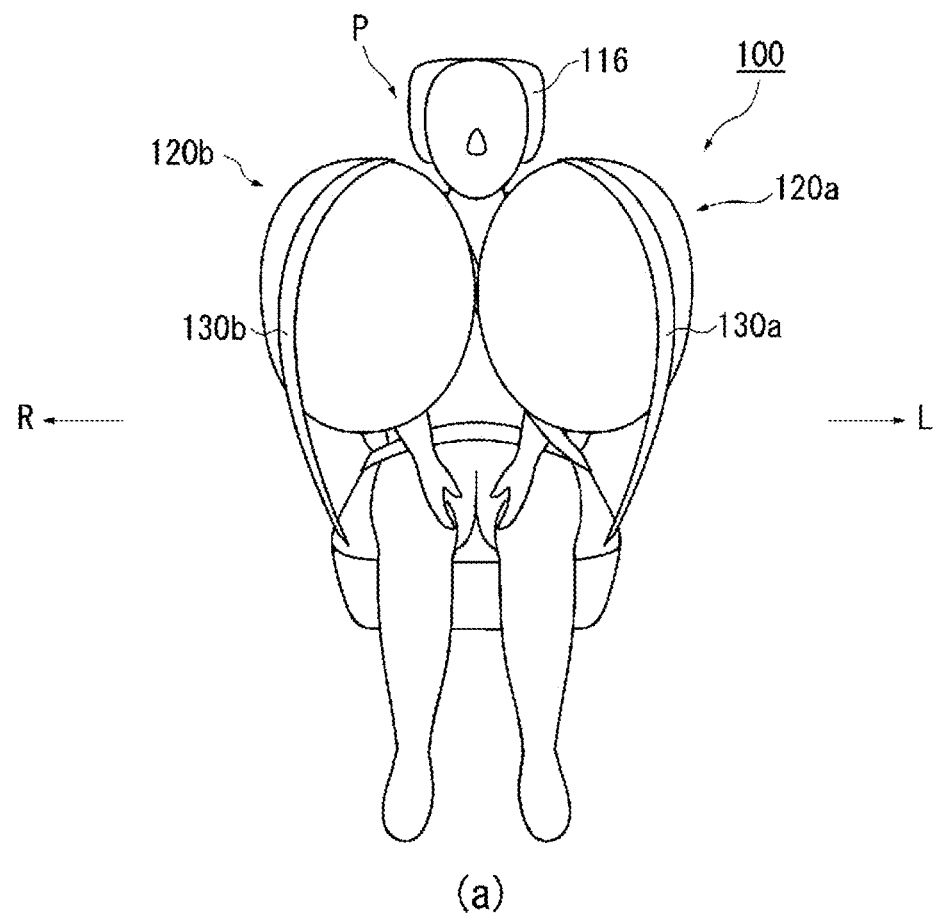
FIG. 3 is a view illustrating the state in which the passenger P is seated in the seat in FIG. 1.
Figure 3:
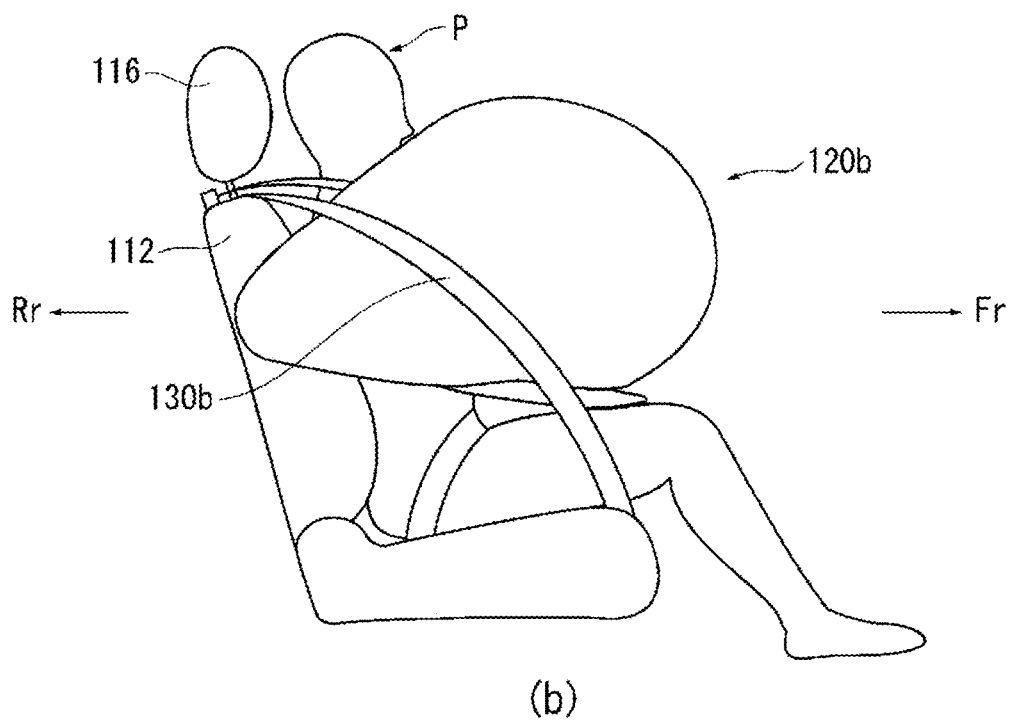
Figure 4:
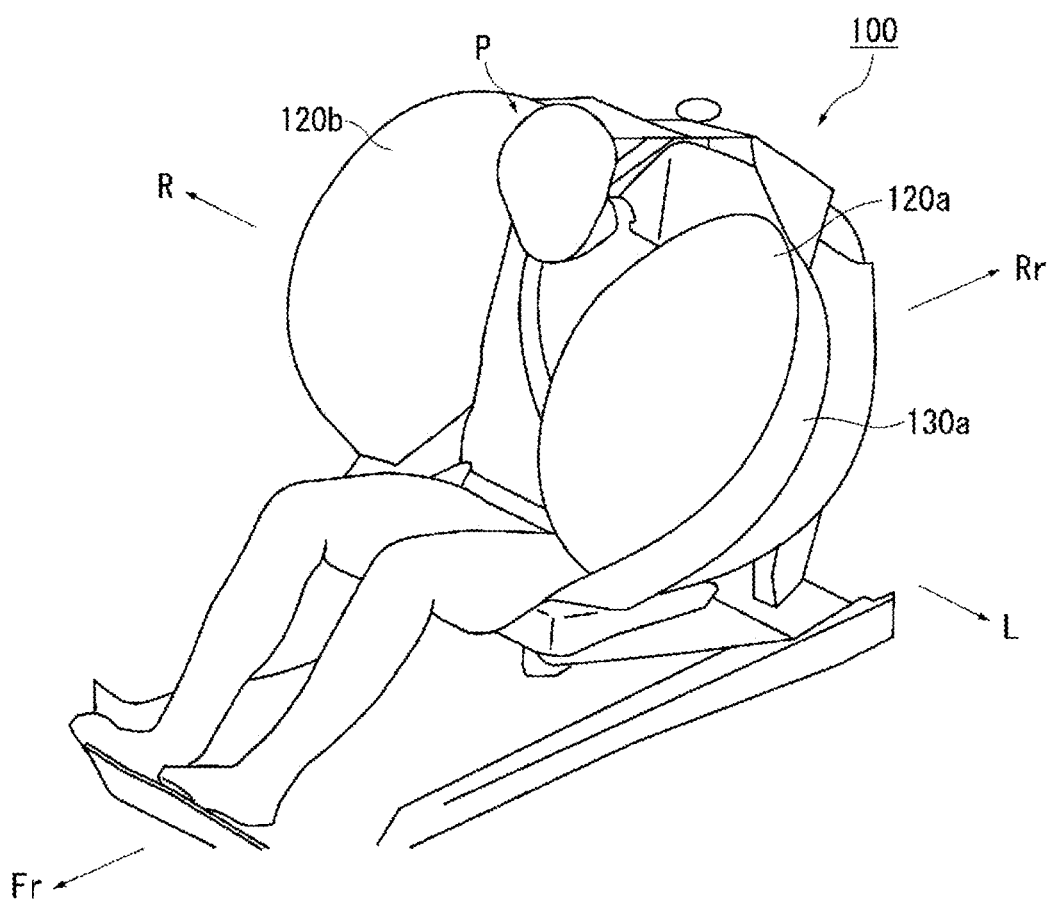
FIG. 4 is a view illustrating the state in which the passenger P is seated in the seat in FIG. 1.

FIGS. 2, 3, and 4 are views each illustrating the state in which the passenger P is seated in the seat 110 in FIG. 1. FIGS. 2(a) and 3(a) illustrate the state in which the seat 110 in FIG. 1 is observed from the front of the vehicle. FIGS. 2(b) and 3(b) illustrate the state in which the seat 110 in FIG. 1 is observed from the side of the vehicle. FIG. 4 illustrates the state in which the seat 110 in FIG. 1 is observed from the diagonal front of the vehicle. FIGS. 2(a)(b) and 4 illustrate the state in which the airbags 120a, 120b are expanded and deployed, in addition to illustrating an AM50 dummy (50 percentile Adult Male dummy) as the passenger P.

As illustrated in FIGS. 2(a)(b), 3(a)(b), and 4, the airbags 120a, 120b are expanded and deployed upon a collision of the vehicle, etc. Each of the tension fabrics 130a, 130b is deployed to the outside of the seat 110 when the skin of the seat 110 is cleft upon the expansion and deployment of the airbags 120a, 120b. At this time, as the characteristics of the present embodiment, the tension fabrics 130a, 130b are stretched from the positions F1, F2 in the vicinity of the shoulder of the passenger P (see FIG. 1) in the seat back 112 to the positions F3, F4 (see FIG. 1) on the front side of the vehicle on the side of the seat cushion 114 so as to hold the surfaces of the airbags 120a, 120b opposite the passenger P.

With the abovementioned configuration, when the airbags 120a, 120b are expanded and deployed, as the tension fabrics 130a, 130b move forward between the seat back 112 and the seat cushion 114, the airbags 120a, 120b are diagonally deployed so as to move downward. As a result, the surfaces of the airbags 120a, 120b opposite the passenger P are held by the tension fabrics 130a, 130b so as to regulate the movement of the airbags 120a, 120b away from the passenger P in the vehicle width direction. Consequently, according to the passenger restraint apparatus 100 of the present embodiment, the passenger restraint performance of the expanded and deployed airbags 120a, 120b can be increased.

As mentioned above, in the passenger restraint apparatus 100 according to the present embodiment, the tension fabrics 130a, 130b are stored from the seat back part 112 to the seat cushion part 114 of the seat 110, and deployed to the outside of the seat 110 when the airbags 120a, 120b are expanded and deployed. Consequently, the abovementioned effects can be obtained without requiring a deploying means having a conventional complex structure.

Particularly in the present embodiment, one end of the pair of tension fabrics 130a, 130b which are respectively provided in the pair of the airbags 120a, 120b is set such that the space D (see FIG. 1) between the positions F1, F2 in the vicinity of the shoulder of the passenger P is narrower than the shoulder width of the AM50 dummy. As a result, when the airbags 120a, 120b are expanded and deployed, the tension fabrics 130a, 130b are deployed and stretched to the outside of the seat 110 with the abovementioned positions F1, F2 serving as the starting points.

As mentioned above, the tension fabrics 130a, 130b which are stretched with the position F1, F2 (having space D which is narrower than the shoulder width of the AM50 dummy) serving as the starting points impart force in the direction of moving to the passenger P side with respect to the pair of airbags 120a, 120b in the vicinity of the shoulder of the passenger P. Consequently, the movement of the airbags 120a, 120b away from the passenger can be more effectively suppressed. Consequently, the airbags 120a, 120b can more assuredly restrain the passenger, improving the passenger restraint performance of the passenger restraint apparatus 100.

Note that, while not limited thereto, FIGS. 3(a) and 3(b) illustrate the configuration in which the tension fabrics 130a, 130b are deployed from the upper surface of the seat cushion 114 to the outside of the seat 110. For example, similar effects can also be obtained by the configuration in which the tension fabrics 130a, 130b are deployed to the outside of the seat 110 from the side of the seat cushion 114 as well as from the vicinity of the boundary between the side and the upper surface.

Figure 5:
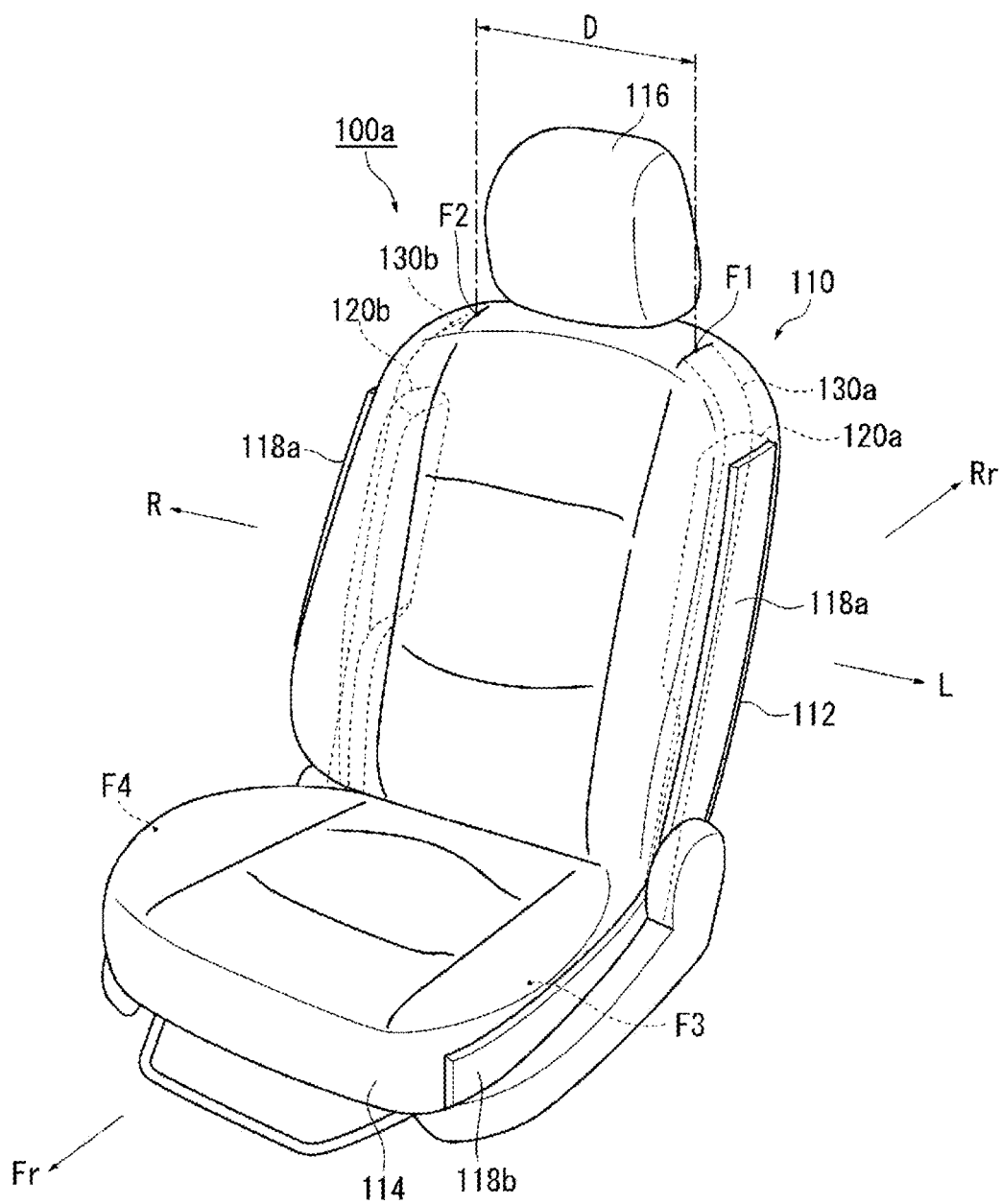
FIG. 5 is a view illustrating another example of the passenger restraint apparatus according to Embodiment 1.

FIG. 5 is a view illustrating another example of the passenger restraint apparatus according to Embodiment 1. The passenger restraint apparatus 100a illustrated in FIG. 5 includes cases 118a, 118b disposed on the side of the seat 110. The case 118a is the case for housing the pair of airbags 120a, 120b, while the case 118b is the case for housing the pair of tension fabrics 130a, 130b. In the passenger restraint apparatus illustrated in FIG. 5, when the airbags are expanded and deployed, the pair of tension fabrics 130a, 130b are deployed from the case 118b to the side of the seat 110. With such a configuration, the same effects as those of the abovementioned passenger restraint apparatus 100 can be obtained.

Figure 6:
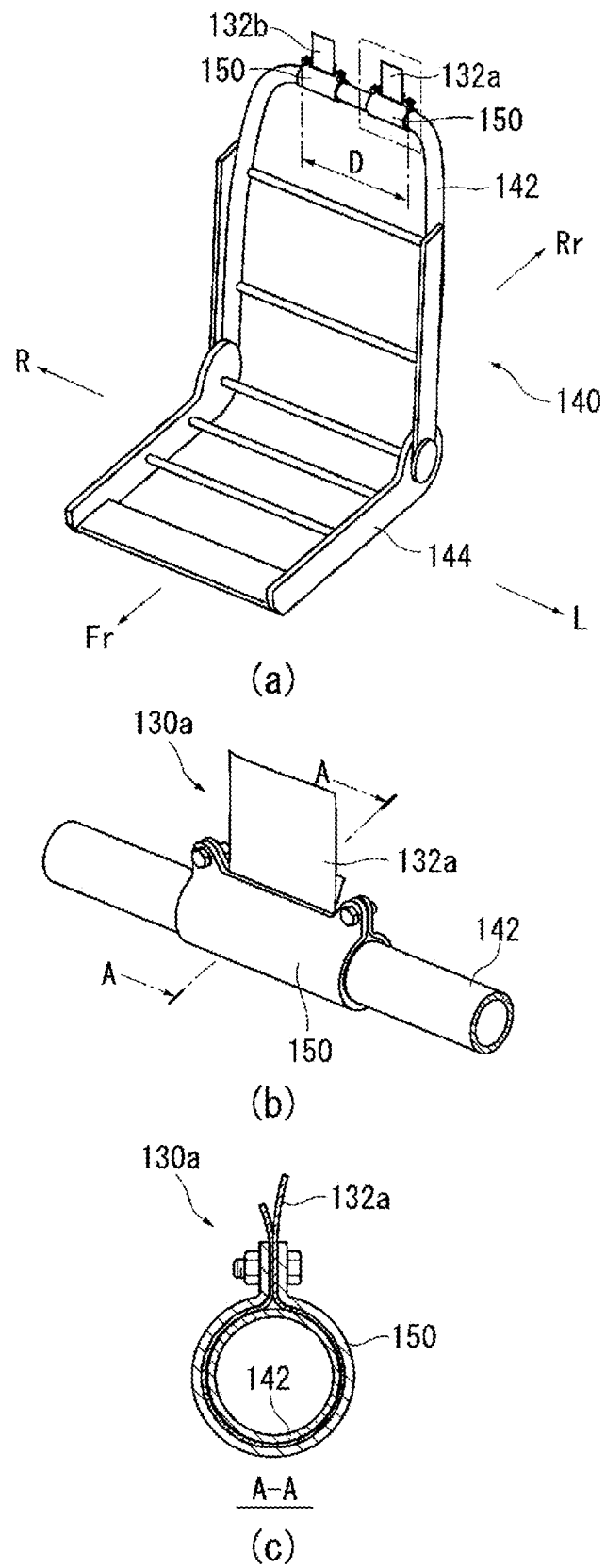
FIG. 6 is a view describing a seat frame disposed inside the seat in FIG. 1.

FIG. 6 is a view describing a seat frame 140 disposed inside the seat 110 in FIG. 1. FIG. 6(a) is an overall view of the seat frame 140. FIG. 6(b) is a partially enlarged view in the square with dashed lines in FIG. 6(a). FIG. 6(c) is a cross sectional view taken along line A-A of FIG. 6(b). FIG. 6 illustrates only the ends 132a, 132b of the tension fabrics 130a, 130b. The structure of the fixing position of the tension fabrics 130a, 130b to the seat frame 140 is common, such that FIGS. 6(b) and (c) illustrate the fixing position of the tension fabric 130a.

The seat frame 140 serving as the skeleton thereof is disposed inside the seat 110 illustrated in FIGS. 1 to 4. As illustrated in FIG. 6(a), the seat frame 140 has an upper frame 142 disposed in the seat back part 112, along with a lower frame 144 disposed in the seat cushion part 114.

In the present embodiment, the upper ends 132a, 132b serving as one end of the tension fabrics 130a, 130b are fixed to the positions in the vicinity of the shoulder of the passenger of the upper frame 142 in the seat frame 140, that is, the positions corresponding to the positions F1, F2 in FIG. 1 in the vehicle width direction. The tension fabrics 130a, 130b are stretched from the position to the outside of the seat 110 upon deployment. The use of the seat frame 140 in this manner enables the tension fabrics 130a, 130b to be stably fixed to the seat 110.

As in the present embodiment, if one end of the tension fabrics 130a, 130b is fixed to the seat frame 140, as illustrated in FIG. 6(a), because the space D between the fixing positions of the ends 132a, 132b to the seat frame 140 is narrower than the shoulder width of the AM50 dummy, the abovementioned effects can be obtained.

As illustrated in FIGS. 6(b) and (c), particularly in the present embodiment, the end 132a of the tension fabrics 130a, 130b is wound around the upper frame 142 of the seat frame 140. The ends 132a, 132b of the tension fabrics 130a, 130b wound around the seat frame 140 are grasped by a bracket 150 grasp so as to be fixed to the seat frame 140. As a result, the tension fabrics 130a, 130b can be more firmly fixed to the seat frame 140. Moreover, the entire part of the ends 132a, 132b of the tension fabrics 130a, 130b wound around the seat frame 140 are covered with the bracket 150. As a result, the abovementioned effects can be increased.

Embodiment 2

Figure 7:
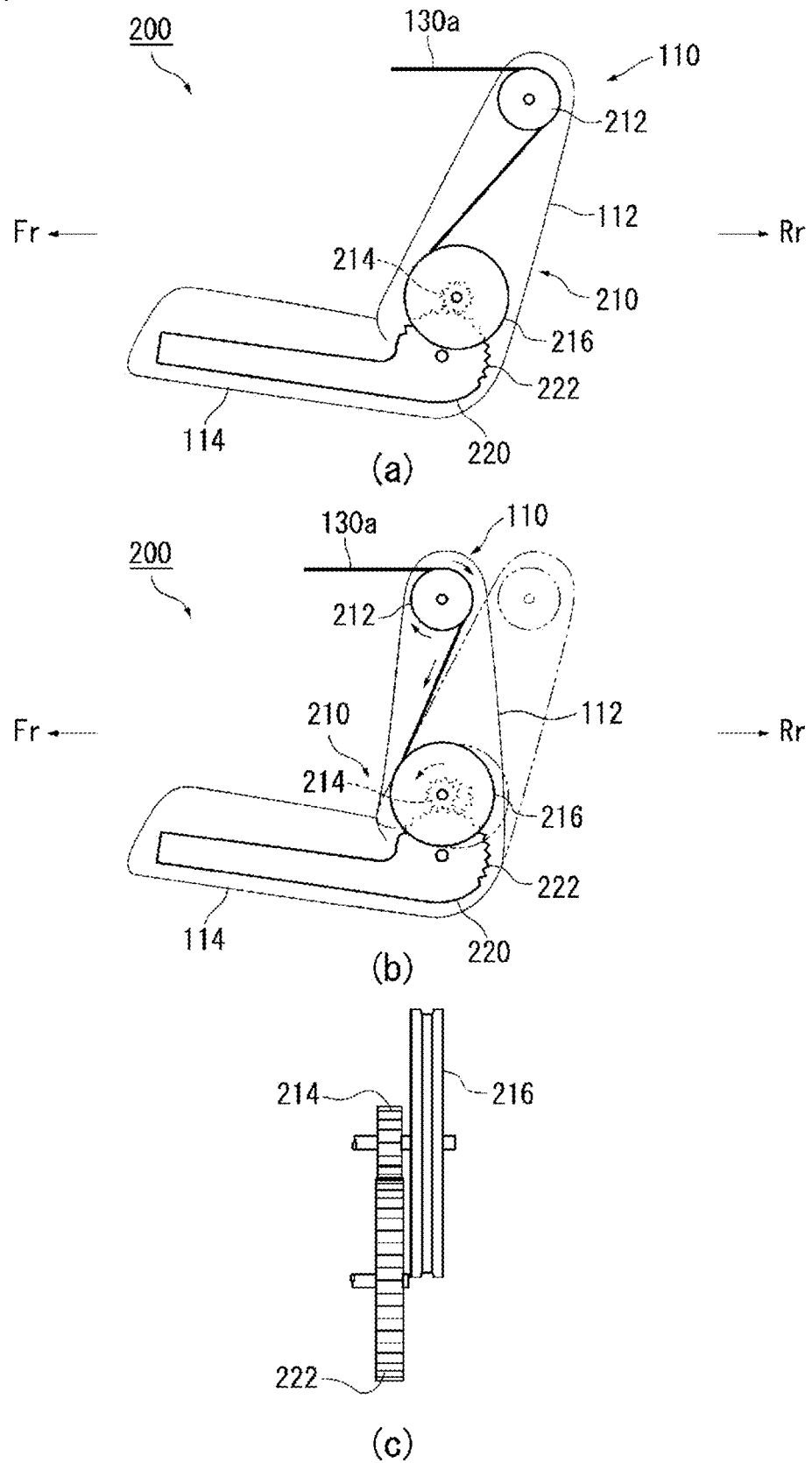
FIG. 7 is a view illustrating a passenger restraint apparatus according to Embodiment 2.

FIG. 7 is a view illustrating a passenger restraint apparatus 200 according to Embodiment 2. FIGS. 7(a) and (b) illustrate the state in which the seat 110 is observed from the side. FIG. 7(c) illustrates the state in which the gear part of a rotation interlocking mechanism 210 in FIG. 6(a) is observed from the front of the vehicle. In the embodiment described below, components common to the passenger restraint apparatus 100 according to Embodiment 1 are labeled with identical symbols in order to omit description. Moreover, in the following description, the rotation interlocking mechanism provided on the left side of the seat 110 is illustrated.

In Embodiment 1, the configuration in which one end of the tension fabrics 130a, 130b is fixed to the seat frame 140 fixed is illustrated. In contrast, in the embodiment described below, the tension fabrics 130a, 130b are coupled to the rotation interlocking mechanism provided in the passenger restraint apparatus.

As illustrated in FIG. 6(a), the passenger restraint apparatus 200 according to Embodiment 2 includes the rotation interlocking mechanism 210 which interlocks with the rotation of a seat back 112 with respect to a seat cushion 114. One end of the tension fabric 130a is coupled to the rotation interlocking mechanism 210 at the position in the vicinity of the shoulder of a passenger P, and stretched from the position to the outside of the seat 110 upon deployment.

As a characteristic of the present embodiment, once the seat back 112 rotates to the front of the vehicle with respect to the seat cushion 114 upon a collision of the vehicle, the tension fabric 130a is pulled by the rotation interlocking mechanism 210 to receive tension. As a result, when the seat back 112 rotates to the front of the vehicle with respect to the seat cushion 114 upon a collision of the vehicle, etc., loosening of the tension fabric 130a is suppressed.

Moreover, the rotation interlocking mechanism 210 also suitably acts on the state of the angle (reclining angle) of the seat back 112 immediately prior to the collision. That is, in the forward reclining state immediately prior to the collision, the rotation interlocking mechanism can prevent loosening of the tension fabrics 130a, 130b upon deployment of an airbag, while in the backward reclining state immediately prior to the collision, the rotation interlocking mechanism 210 can similarly prevent the tension fabrics from being excessively pulled upon deployment of the airbag. Consequently, the effects of holding an airbag 120a with the tension fabric 130a can be suitably ensured.

Specifically, as illustrated in FIG. 7(a), the rotation interlocking mechanism 210 of the passenger restraint apparatus 200 according to Embodiment 2 includes a support 212, a first gear 214, and a pulley 216. The support 212 is incorporated in the upper part of the seat back 112 so as to support the tension fabric 130a at the position in the vicinity of the shoulder of the passenger P. As the support 212, a shaft body and the pulley can be exemplified.

The first gear 214 illustrated in FIG. 7(c) is a rotatable gear, wherein the pulley 216 which rotates with the first gear 214 is fixed to the side thereof. The tension fabric 130a incoming from the support 212 is supported by the pulley 216. As a result, the tension fabric 130a incoming from the support 212 is indirectly connected to the first gear 214 via the pulley 216. A fixed gear 222 is formed in a vehicle body member 220 adjacent to the seat back 112 of the seat 110 via gear cutting. The first gear 214 engages with the fixed gear 222 formed in the vehicle body member 220.

Upon a collision of the vehicle, etc., the seat back 112 rotates to the front of the vehicle from the position of FIG. 7(a) to the position of FIG. 7(b) with respect to a seat cushion 114. The first gear 214 rotates in the direction of winding the tension fabric 130a (in the present embodiment, counterclockwise) by interlocking with the rotation of the seat back 112. As a result, in the pulley 216 which rotates by interlocking with the first gear 214, the tension fabric 130a is wound.

With the abovementioned configuration, tension can be imparted to the tension fabric 130a so as to reduce loosening of the tension fabric 130a when the seat back 112 rotates. Consequently, the forward movement of the airbag 120a and the passenger P due to loosening of the tension fabric 130a can be suitably suppressed. Moreover, in the configuration in which the tension fabric 130a is supported by the pulley 216, the tension fabric 130a can be smoothly wound without being entangled with the first gear 214.

Figure 8:
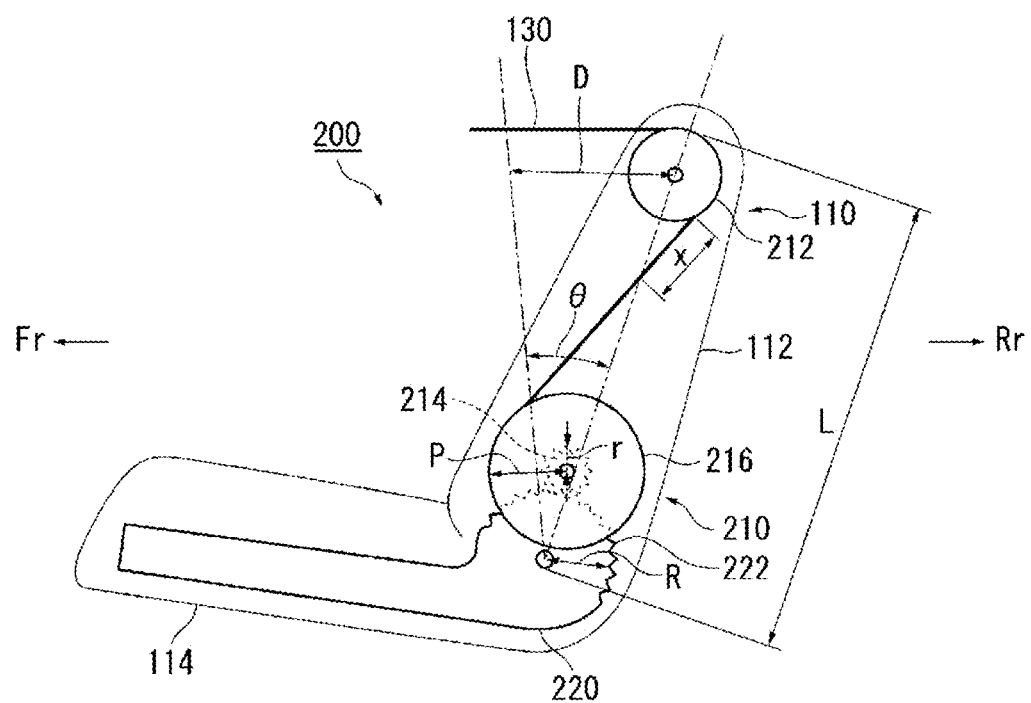
FIG. 8 is a view describing the size of each part of the rotation interlocking mechanism in FIG. 7.

FIG. 8 is a view describing the size of each part of the rotation interlocking mechanism 210 in FIG. 7. The length of the seat back 112 is L. The radius of the fixed gear 222 is R. The radius of the first gear 214 is r. The radius of the pulley is P. The rotation angle upon rotation of the seat back 112 is θ. The forward movement amount upon rotation of the upper part of the seat back 112 is D. The ratio (R/r) of the radius of the fixed gear 222 to the radius of the first gear 214 is n.

The forward movement amount D of the upper part of the seat back 112 upon rotation of the seat back 112 is "D=L sinθ", or "D=Lθ (formula 1)" if the rotation angle θ is small. The winding amount x for the pulley 216 to wind the tension fabric upon rotation of the seat back 112 is "x=(R/r)Pθ (formula 2)". Consequently, according to formulas 1 and 2, if "L=nP" is satisfied, the forward movement amount D of the upper part of the seat back 112 is equal to the winding amount x for the pulley 216 to wind the tension fabric 130a, thereby offsetting the forward movement amount of the upper part of the seat back 112. As a result, the abovementioned effects can be obtained.

Embodiment 3

Figure 9:
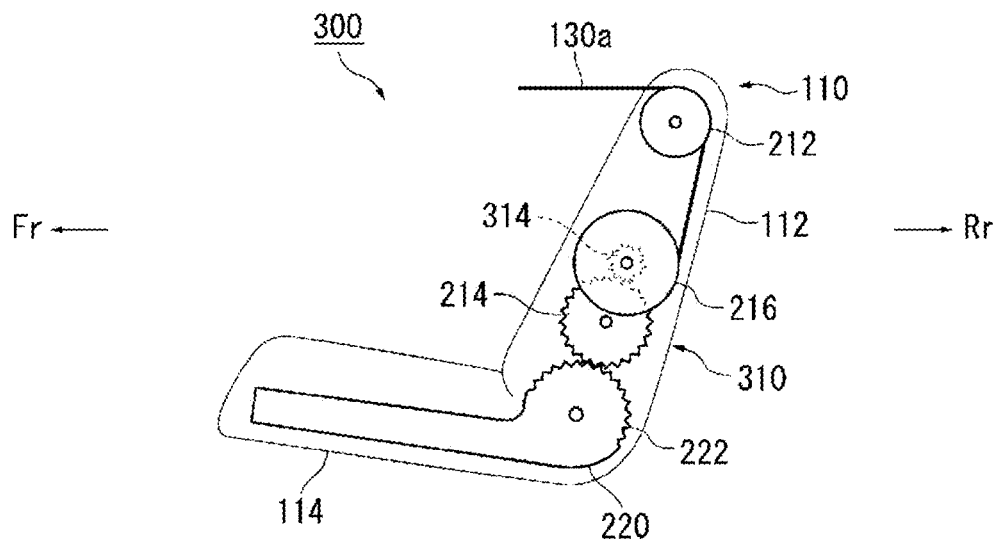
FIG. 9 is a view illustrating a passenger restraint apparatus according to Embodiment 3.
Figure 9:
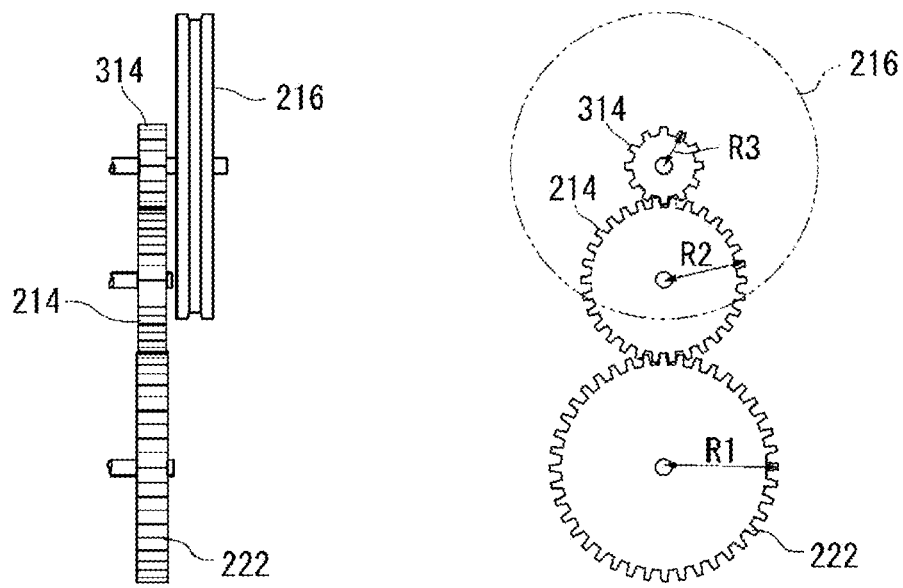

FIG. 9 is a view illustrating a passenger restraint apparatus 300 according to Embodiment 3. FIG. 9(a) illustrates the state in which the seat 110 is observed from the side. FIG. 9(b) illustrates the state in which the gear part of a rotation interlocking mechanism 310 in FIG. 9(a) is observed from the front of the vehicle. FIG. 9(c) illustrates the state in which the gear part of the rotation interlocking mechanism 310 in FIG. 9(a) is observed from the side of the vehicle.

The passenger restraint apparatus 300 according to Embodiment 3 differs from the passenger restraint apparatus according to Embodiment 2 in that the rotation interlocking mechanism 310 further includes a second gear 314. As illustrated in FIGS. 9(a) and (b), the rotation interlocking mechanism 310 of the passenger restraint apparatus 300 according to Embodiment 3 includes the second gear 314 engaging with the first gear 214. The second gear 314 is fixed to the side of the pulley 216. The tension fabric 130a is connected to the first gear 214 via the pulley 216 and the second gear 314.

As the rotation interlocking mechanism 310 according to Embodiment 3 includes multiple gears consisting of the first gear 214 and the second gear 314, the gears can be more smoothly rotated. Consequently, when the seat back 112 rotates to the front of the vehicle, the tension fabric 130a can be rapidly wound. If the radius of the fixed gear 222 is R1, the radius of the first gear 214 is R2, and the radius of the second gear 314 is R3, the conditions for offsetting the movement amount D of the upper part of the seat back 112 are "L=(R1/R2)×(R2/R3)×P=(R1/R3)×P".

Embodiment 4

Figure 10:
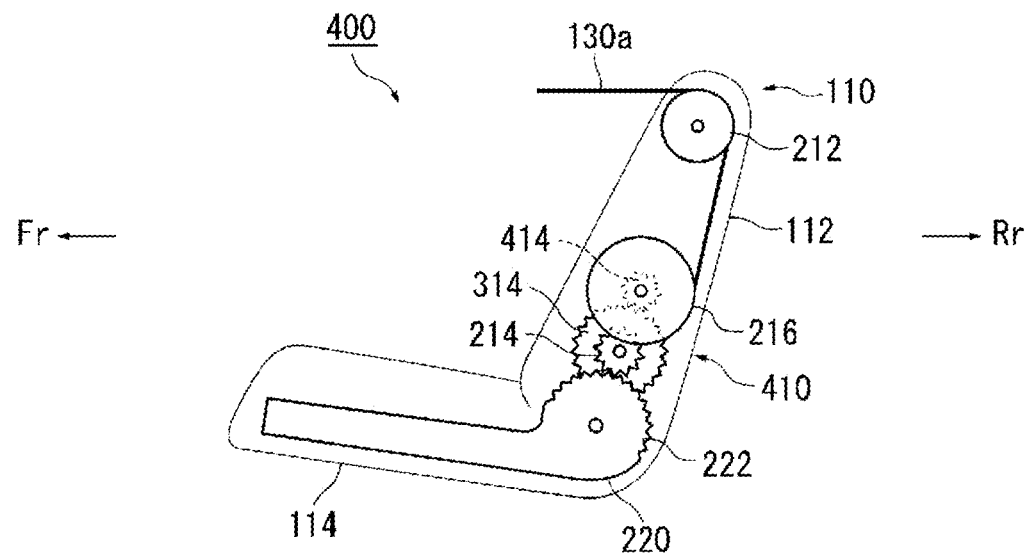
FIG. 10 is a view illustrating a passenger restraint apparatus according to Embodiment 4.
Figure 10:
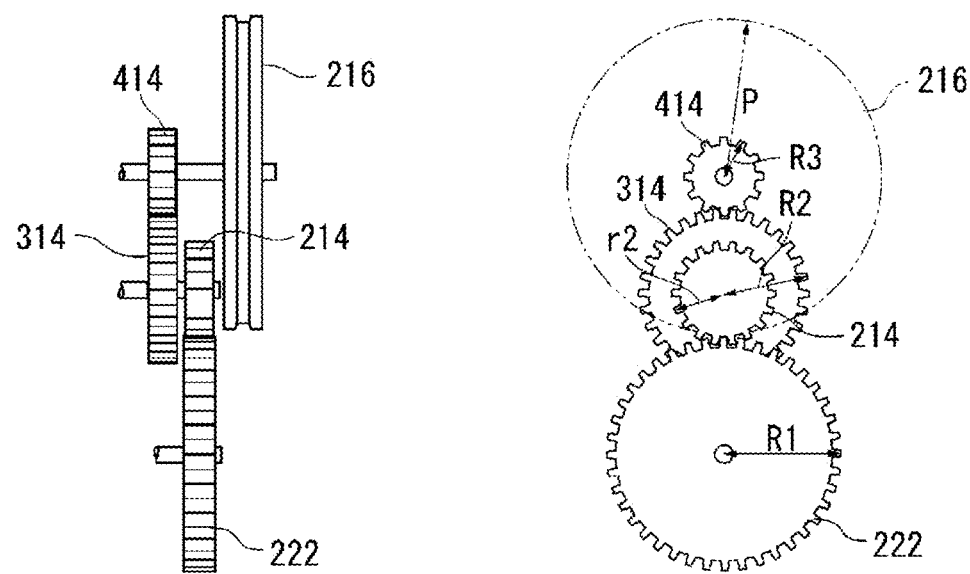

FIG. 10 is a view illustrating a passenger restraint apparatus 400 according to Embodiment 4. FIG. 10(*a*) illustrates the state in which the seat 110 is observed from the side. FIG. 10(*b*) illustrates the state in which the gear part of a rotation interlocking mechanism 410 in FIG. 10(*a*) is observed from the front of the vehicle. FIG. 10(*c*) illustrates the state in which the gear part of the rotation interlocking mechanism 410 in FIG. 10(*a*) is observed from the side of the vehicle.

The passenger restraint apparatus 400 according to Embodiment 4 differs from the passenger restraint apparatuses according to Embodiments 2 and 3 in that the rotation interlocking mechanism 410 further includes a third gear 414. As illustrated in FIGS. 10(*a*) and (*b*), the rotation interlocking mechanism 410 of the passenger restraint apparatus 400 according to Embodiment 4 includes multiple gears consisting of the first gear 214, the second gear 314, and the third gear 414.

The second gear 314 is fixed to the side of the first gear 214 so as to rotate by interlocking with such first gear 214. That is, in the present embodiment, the first gear 214 and the second gear 314 have a two-stage gear structure. The third gear 414 is fixed to the side of the pulley 216 so as to engage with the second gear 314. The tension fabric 130*a* is connected to the first gear 214 via the pulley 216, the second gear 314, and the third gear 414.

As the rotation interlocking mechanism 410 according to Embodiment 4 includes multiple gears consisting of the first gear 214, the second gear 314, and the third gear 414, the gears can be further smoothly rotated. Consequently, when the seat back 112 rotates to the front of the vehicle, the tension fabric 130*a* can be more rapidly wound. If the radius of the fixed gear 222 is R1, the radius of the first gear 214 is r2, the radius of the second gear 314 is R2, the radius of the third gear 414 is R3, and the radius of the radius of the pulley 216 is P, the conditions for offsetting the movement amount of the upper part of the seat back 112 are "L=(R1/r2)×(R2/R3)×P".

Embodiment 5

Figure 11:
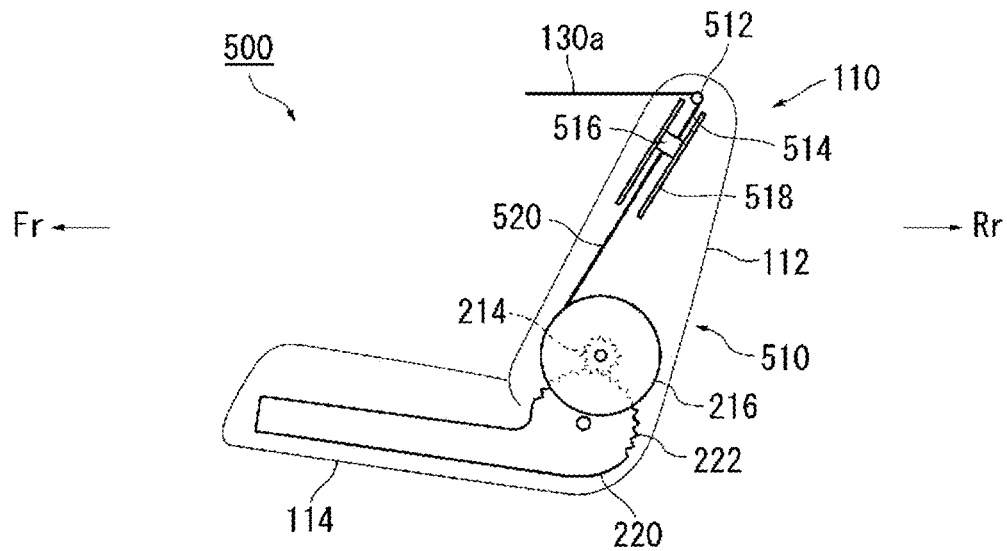
FIG. 11 is a view illustrating a passenger restraint apparatus according to Embodiment 5.
Figure 11:
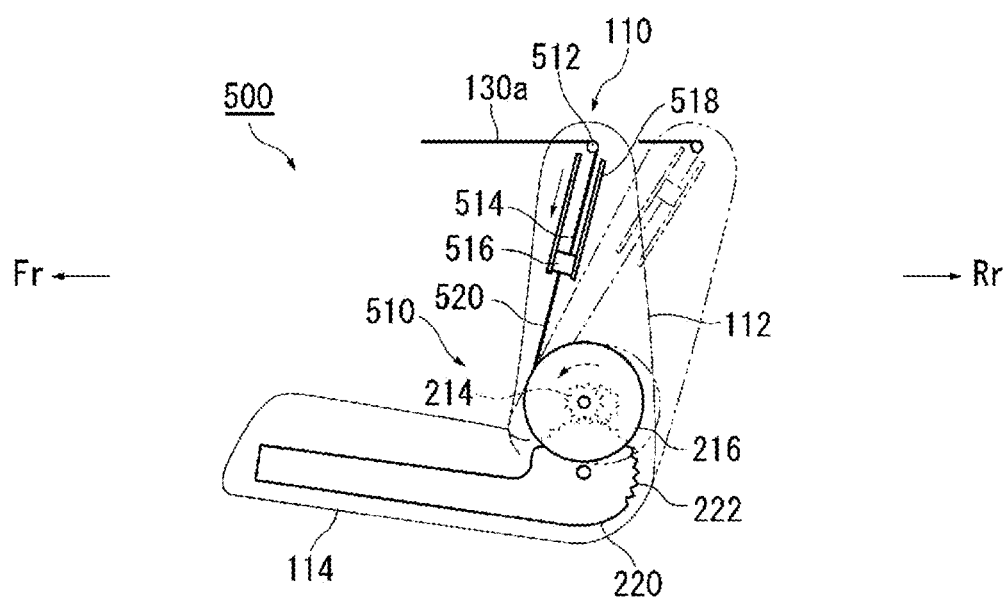

FIG. 11 is a view illustrating a passenger restraint apparatus 500 according to Embodiment 5. FIGS. 11(*a*) and (*b*) illustrate the state in which the seat 110 is observed from the side. As illustrated in FIG. 11(*a*), in the passenger restraint apparatus 500 according to Embodiment 5, the tension fabric 130*a* is supported by a support 512 including a shaft body. The end of the tension fabric 130*a* is connected to one end of a coupling wire 514 in the vicinity of the support 512.

A rotation interlocking mechanism 510 of the passenger restraint apparatus 500 according to Embodiment 5 includes a slider 516, a rail 518, and a tether 520. The slider 516 couples the other end of the coupling wire 514 along with the tether 520. The slider 516 is slidably movable in the rail 518. The tether 520 is connected to the pulley 216. With such a configuration, the tension fabric 130*a* is connected to the first gear 214 via the support 512, the coupling wire 514, the slider 516, and the pulley 216.

Upon a collision of the vehicle, etc., the seat back 112 rotates to the front of the vehicle from the position of FIG. 11(*a*) to the position of FIG. 11(*b*) with respect to a seat cushion 114. Hence, the first gear 214 rotates in the direction of winding the tension fabric 130*a* (in the present embodiment, counterclockwise) by interlocking with the rotation of the seat back 112. As a result, the tether 520 is wound by the pulley 216, after which the slider 516 moves downward in the rail 518.

When the slider 516 moves downward, the coupling wire 514 is pulled downward. In addition, the tension fabric 130*a* connected to the coupling wire 514 is drawn into the seat back 112. As a result, tension can be imparted to the tension fabric 130*a* so as to reduce loosening of the tension fabric 130*a* when the seat back 112 rotates.

Embodiment 6

Figure 12:
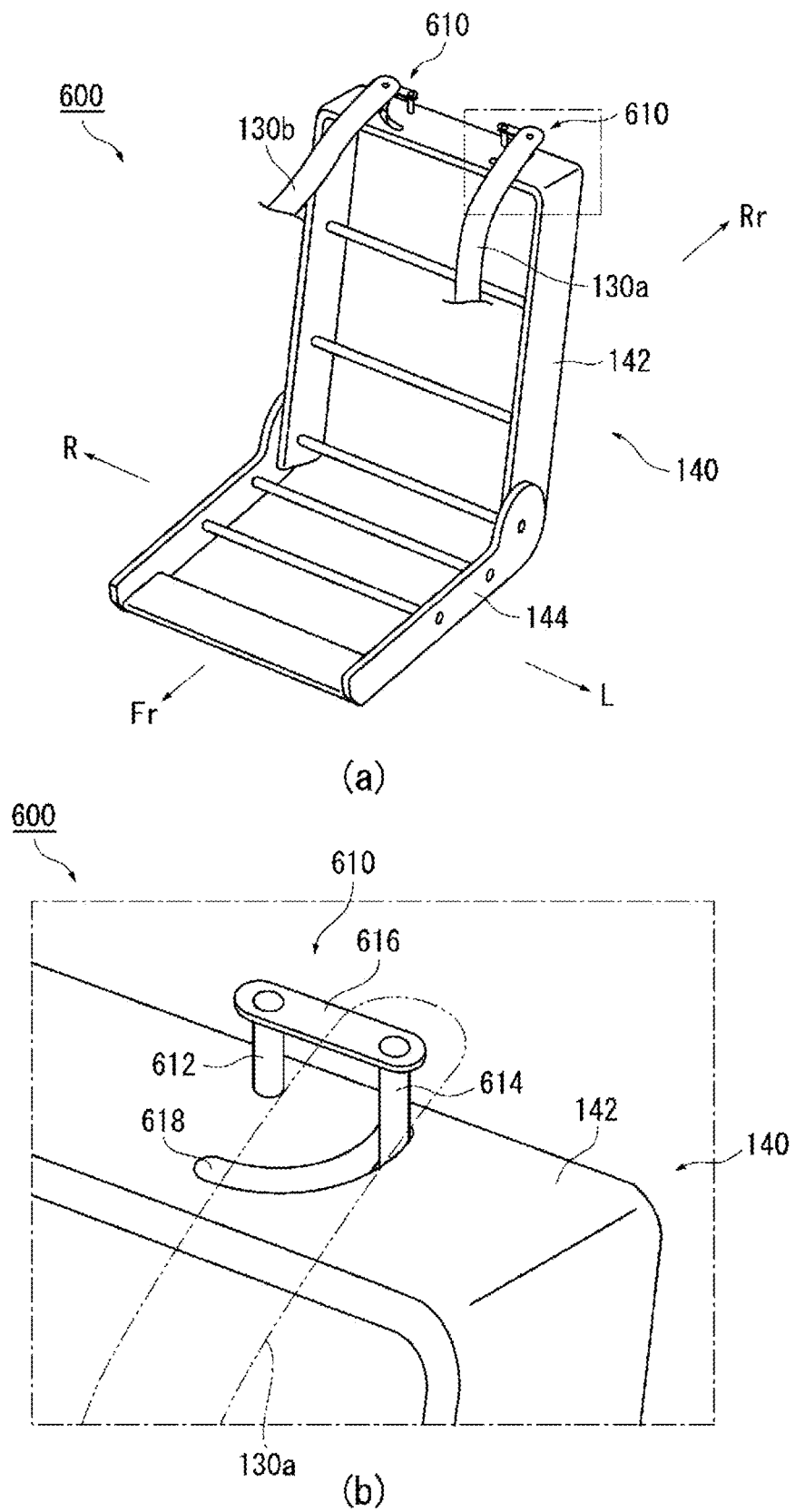
FIG. 12 is a view illustrating a passenger restraint apparatus according to Embodiment 6.

FIG. 12 is a view illustrating a passenger restraint apparatus 600 according to Embodiment 6. FIG. 12(*a*) is a view illustrating the seat frame 140 disposed inside the seat 110 in FIG. 1, while FIG. 12(*b*) is a partially enlarged view of FIG. 12(*a*). Note that components common to the previously described embodiments are labeled with identical symbols in order to avoid redundant description. Moreover, in order to facilitate understanding, FIG. 12(*b*) illustrates the tension fabric 130*a* in FIG. 12(*a*) by virtual lines (double dot chain lines).

As illustrated in FIG. 12(*a*), the passenger restraint apparatus 600 according to Embodiment 6 includes a load relief mechanism 610. The load relief mechanism 610 relieves the load which is applied from the tension fabrics to the seat frame 140, that is, to the seat 110 (see FIG. 1) when the tension fabrics 130*a*, 130*b* are deployed. Note that in FIG. 12(*a*), the load relief mechanisms are provided on both the left and right tension fabrics 130*a*, 130*b*, such that the two load relief mechanisms 610 have a symmetrically identical configuration. Consequently, the load relief mechanism 610 provided on the tension fabric 130*a* on the left side will hereinafter be illustrated and described.

As illustrated in FIG. 12(*b*), the load relief mechanism 610 includes a first shaft 612, a second shaft 614, a coupling part 616, and a guide hole 618. The first shaft 612 is a bar shaped member (torsion bar) which is fixed to the seat frame 140 at the position in the vicinity of the shoulder of a passenger in the seat back 112 (see FIG. 1) of the seat 110. An arc shaped guide hole 618 with the first shaft 612 serving as the center is formed in the seat frame 140.

The second shaft 614 is a bar shaped member movable in the guide hole 618, with one end of the tension fabric 130*a* fixed thereto. As a result, as the second shaft 614 moves, one end of the tension fabric 130*a* moves by interlocking with it. The first shaft 612 and the second shaft 614 are coupled by the coupling part 616. As a result, the second shaft 614 is rotatable such that the first shaft 612 coupled by the coupling part 616 serves as a fulcrum.

Figure 13:
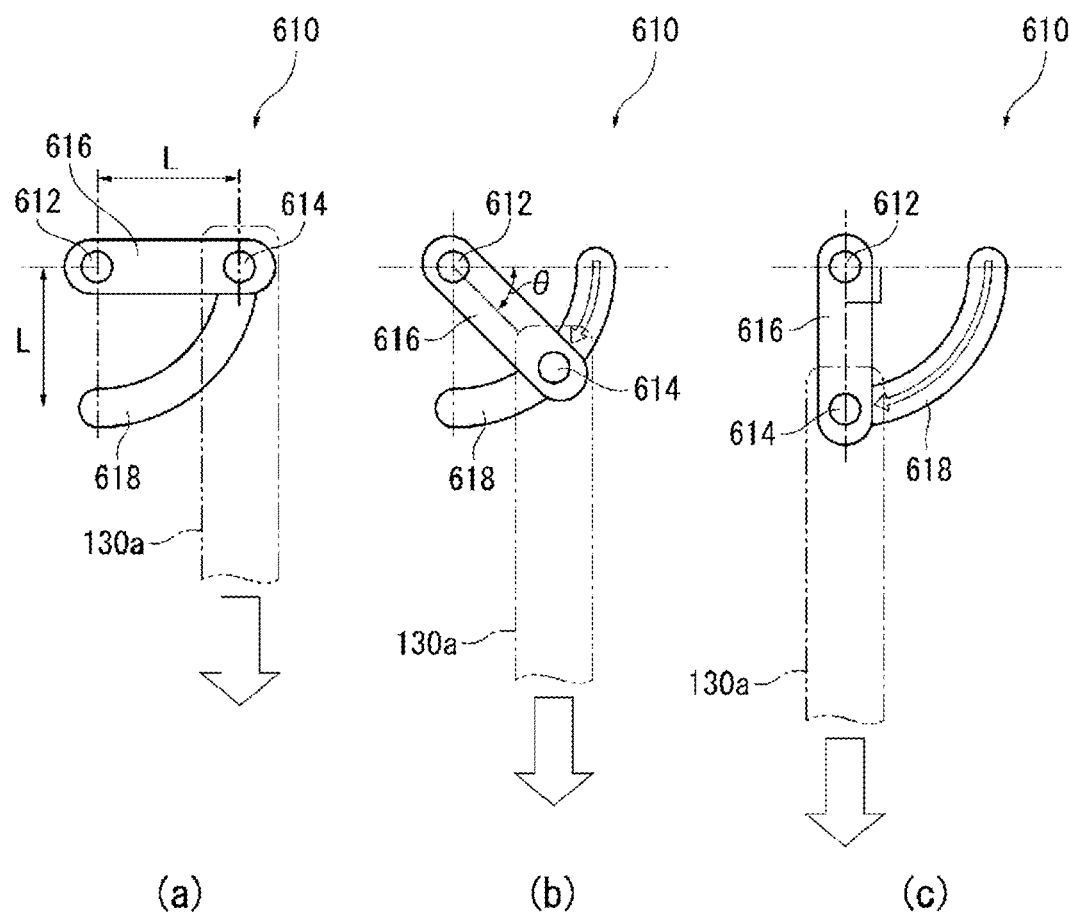
FIG. 13 is a view describing the operation of a load relief mechanism.

FIG. 13 is a view describing the operation of a load relief mechanism 610. As illustrated in FIG. 13(*a*), when the length between the first shaft 612 and the connecting part of the second shaft 614 in the coupling part 616 is L, the guide hole 618 is a circular arc of the radius L with the first shaft 612 serving as the center. If the load applied from the tension fabric 130*a* to the seat 110 via the second shaft 614 is less than a predetermined value, as illustrated in FIG. 13(*a*), the second shaft 614 is disposed at the end on the rear side of the arc shaped guide hole 618 (initial position).

As the airbag 120a (see FIG. 2) is expanded and deployed, the tension of the tension fabric 130a increases. Hence, the load applied to the second shaft 614 to which one end of the tension fabric 130a is connected increases. When the load applied from the tension fabric 130a to the seat 110 via the second shaft 614 is a predetermined value or more, as illustrated in FIG. 13(b), the second shaft 614 is pulled by the end of the tension fabric 130a. As a result, the second shaft 614 slidably moves and rotates in the guide hole 618 from the initial position.

Subsequently, as illustrated in FIG. 13(c), when the second shaft 614 rotates in an arc shaped guide hole 618 so as to reach the end on the front side of the guide hole 618, the second shaft 614 stops the rotation. As a result, the tension fabric 130a moves forward from the position illustrated in FIG. 13(a) to the position illustrated in FIG. 13(c) so as to loosen the tension fabric 130a and relieve the load applied to the seat 110.

As described above, when the passenger restraint apparatus 600 includes the load relief mechanism 610, and a large load is thereby applied from the tension fabric 130a to the seat 110 upon deployment, the load relief mechanism 610 functions. As a result, because the load applied to the seat 110 is relieved, any damage to the seat 110 caused by the load from the tension fabric 130a can be suitably prevented.

Moreover, with the abovementioned configuration, when the load relief mechanism 610 moves the second shaft 614, one end of the tension fabric 130a moves by interlocking with it. As a result, the space between the positions in the vicinity of the shoulder may be narrower after the tension fabric 130a is deployed than before the tension fabric 130a is deployed, with the positions serving as the starting points across which the tension fabric 130a is stretched. Consequently, the airbag can further approach the passenger side by the tension fabric so as to more efficiently restrain the shoulder of the passenger.

A preferred example of the present invention was described above while referring to the accompanying drawings. However, the embodiment described above is a preferred example of the present invention, with other embodiments capable of being implemented or performed by various methods. In particular, unless described otherwise in the specification of the present application, the invention is not restricted to the shape, size, configurational disposition, and the like of the parts illustrated in detail in the accompanying drawings. Furthermore, expressions and terms used in the specification of the present application are used for providing a description, and thus, the invention is not limited thereto, unless particularly described otherwise.

Consequently, it is obvious that a person with ordinary skill in the art can conceive of various changed examples or modified examples within the scope described in the scope of the claims, which is understood to naturally belong to the technical scope of the present invention.

While a pair of left and right airbags have been illustrated, the present embodiment is not limited thereto. The present invention is applicable to a passenger restraint apparatus in which an airbag is provided on either one of the left and right seat backs of a seat, wherein such an airbag is expanded and deployed to the side of the passenger seated in the seat. Moreover, while the pair of left and right tension fabrics have been illustrated, the present embodiment is not limited thereto. If the airbag is provided on either one of the left and right seat backs of the seat, needless to say, a tension fabric may be provided only on the one side.

INDUSTRIAL APPLICABILITY

The present invention is applicable to a passenger restraint apparatus for restraining a passenger seated in a seat of a vehicle.

The invention claimed is:

1. A passenger restraint apparatus for restraining a passenger seated in a seat of a vehicle in combination with the seat, the passenger restraint apparatus comprising:
    an airbag normally stored in a seat back of the seat for expansion and deployment to a lateral side of the passenger seated in the seat;
    a tension fabric normally stored within the seat back on a laterally outboard side of the airbag when the airbag is stored in the seat, the tension fabric extending from the seat back of the seat to a seat cushion part, at least a portion of the tension fabric configured to be deployed to an outside of the seat by a cleaving of a skin of the seat upon expansion and deployment of the airbag, and the tension fabric being stretchable from a first position in a vicinity of a shoulder of the passenger in the seat back to a second position on a front side of the vehicle on the side of the seat cushion, the tension fabric including a part for holding a surface of the airbag opposite the passenger; and
    a load relief mechanism for relieving a load applied from the tension fabric to the seat upon deployment of the tension fabric.

2. The passenger restraint apparatus according to claim 1, wherein a skeleton is formed in the seat by a seat frame disposed thereinside, and wherein one end of the tension fabric is fixed to the seat frame in the vicinity of the shoulder of the passenger in the seat back of the seat.

3. The passenger restraint apparatus according to claim 1, wherein a skeleton is formed in the seat by a seat frame disposed thereinside, and wherein the load relief mechanism comprises: a first shaft which is fixed to the seat frame at the position in the vicinity of the shoulder of the passenger in the seat back of the seat; a guide hole formed in an arc shape in the seat frame around the first shaft; a second shaft which is movable in the guide hole and to which one end of the tension fabric is fixed; and a coupling part which couples the first shaft and the second shaft so as to make this second shaft rotatable with this first shaft serving as a fulcrum, and wherein, when the tension fabric is deployed to an outside of the seat and a load applied from the tension fabric to the seat via the second shaft is at least a predetermined value, the second shaft rotates so as to loosen the tension fabric and relieve the load.

4. A passenger restraint apparatus in combination with a seat of a vehicle and for restraining a passenger seated in the seat, this passenger restraint apparatus comprising:
    a pair of airbags including a first airbag and a second airbag, the first and second airbags stored in a seat back part of the seat so as to be expandable and deployable to both sides of the passenger seated in the seat; and
    a pair of tension fabrics including first and second tension fabrics associated with the first and second airbags, respectively, the first and second tension fabrics normally stored with the seat back such that the first tension fabric is on a first laterally outboard side of the first airbag and the second tension fabric is on a second laterally outboard side of the second airbag,
    wherein, when the first and second airbags are expanded and deployed, at least a portion of both of the pair of tension fabrics is configured so as to be deployed to an outside of the seat, in addition to being stretchable from a first position in a vicinity of the shoulder of the passenger in the seat back to a second position on the front side of the vehicle on the side of the seat cushion, the tension fabric including a part for holding the surface of the airbag opposite the passenger, and wherein a space between the first and second positions in the vicinity of the shoulder is narrower than the shoulder width of an AM50 dummy, with the first and second positions serving as the starting points across which the tension fabrics are stretched, wherein the space between the first and second positions in the vicinity of the shoulder is narrower after the tension fabrics are deployed than before the tension fabrics are deployed, with the first and second positions serving as the starting points across which the tension fabrics are stretched.

5. The passenger restraint apparatus according to claim 4, wherein, when the airbag is expanded and deployed, at least a portion of each of the first and second tension fabrics is configured so as to be deployed to an outside of the seat by a cleaving of a skin of the seat.

6. The passenger restraint apparatus according to claim 4, wherein this passenger restraint apparatus further comprises a case which is disposed on the side of the seat so as to house at least a portion of each of the tension fabrics, and wherein, when the airbag is expanded and deployed, at least a portion of each of the pair of tension fabrics is configured so as to be deployed from the case to an outside of the seat.

7. A passenger restraint apparatus for restraining a passenger seated in a seat of a vehicle in combination with the seat, the passenger restraint apparatus comprising:
   an airbag for storage in a seat back part of the seat for expansion and deployment to a first side of the passenger seated in this seat;
   a tension fabric normally stored within the seat back on a laterally outboard side of the airbag when the airbag is stored in the seat, the tension fabric extending from the seat back of the seat to a seat cushion part, at least a portion of the tension fabric configured to be deployed to an outside of the seat by a cleaving of a skin of the seat upon expansion and deployment of the airbag, and the tension fabric being stretched from a first position in a vicinity of a shoulder of the passenger in the seat back to a second position on a front side of the vehicle on the side of the seat cushion, the tension fabric including a part for holding a surface of the airbag opposite the passenger;
   a skeleton formed in the seat by a seat frame disposed thereinside, one end of the tension fabric fixed to the seat frame at the position in the vicinity of the shoulder of the passenger in the seat back of the seat so as to be stretched with the position serving as the starting point, the one end of the tension fabric wound around the seat frame, and
   a bracket grasping the one end of the tension fabric wound around the seat frame so as to fix the one end to this seat frame.

8. The passenger restraint apparatus according to claim 7, wherein the bracket covers the entire part of one end of the tension fabric wound around the seat frame.

9. A passenger restraint apparatus for restraining a passenger seated in a seat of a vehicle in combination with the seat, the passenger restraint apparatus comprising:
   an airbag for storage in a seat back part of the seat for expansion and deployment to a lateral side of the passenger seated in the seat;
   a tension fabric normally stored within the seat back on a laterally outboard side of the airbag when the airbag is stored in the seat, the tension fabric extending from the seat back of the seat to a seat cushion part, at least a portion of the tension fabric configured to be deployed to an outside of the seat by a cleaving of a skin of the seat upon expansion and deployment of the airbag, and the tension fabric being stretched from a first position in a vicinity of a shoulder of the passenger in the seat back to a second position on a front side of the vehicle on the side of the seat cushion, the tension fabric including a part for holding a surface of the airbag opposite the passenger; and
   a rotation interlocking mechanism which interlocks with the rotation of the seat back to the seat cushion,
   wherein one end of the tension fabric is coupled to the rotation interlocking mechanism at the position in the vicinity of the shoulder of the passenger so as to be stretched with this position serving as the starting point,
   wherein, when the seat back rotates to the front of the vehicle with respect to the seat cushion upon a collision of the vehicle, the tension fabric is pulled by the rotation interlocking mechanism to receive tension.

10. The passenger restraint apparatus according to claim 9, wherein the rotation interlocking mechanism comprises: a support for supporting the tension fabric at the position in the vicinity of the shoulder of the passenger; and a first gear to which the tension fabric incoming from the support is indirectly connected, and wherein, when the seat back rotates to the front of the vehicle with respect to the seat cushion upon a collision of the vehicle, the first gear rotates in the direction of winding the tension fabric by interlocking with this rotation so as to impart tension to the tension fabric.

11. The passenger restraint apparatus according to claim 10, wherein the rotation interlocking mechanism further comprises a pulley for supporting the tension fabric incoming from the support, wherein the first gear is fixed to the side of the pulley, and wherein the tension fabric is connected to the first gear via the pulley.

12. The passenger restraint apparatus according to claim 10, wherein the rotation interlocking mechanism further comprises: a pulley for supporting the tension fabric incoming from the support; a second gear which is fixed to a side of the pulley so as to engage with the first gear, and wherein the tension fabric is connected to the first gear via the pulley and the second gear.

13. The passenger restraint apparatus according to claim 10, wherein the rotation interlocking mechanism further comprises: a pulley for supporting the tension fabric incoming from the support; a second gear which is fixed to the side of the first gear so as to rotate by interlocking with this first gear; and a third gear which is fixed to the side of the pulley so as to engage with the second gear, and wherein the tension fabric is connected to the first gear via the pulley, the second gear, and the third gear.

* * * * *